US012416523B2

(12) United States Patent
Viosca et al.

(10) Patent No.: US 12,416,523 B2
(45) Date of Patent: Sep. 16, 2025

(54) SCALES, SUCH AS FOR USE WITH COOKING APPLIANCES

(71) Applicant: BREVILLE USA, INC., Torrance, CA (US)

(72) Inventors: Alan Lee Viosca, Torrance, CA (US); Matthew Morris Taylor, Torrance, CA (US)

(73) Assignee: BREVILLE USA, INC., Torrance, CA (US)

( * ) Notice: Subject to any disclaimer, the term of this patent is extended or adjusted under 35 U.S.C. 154(b) by 1036 days.

(21) Appl. No.: 17/426,591

(22) PCT Filed: Jan. 30, 2020

(86) PCT No.: PCT/IB2020/050718
§ 371 (c)(1),
(2) Date: Jul. 28, 2021

(87) PCT Pub. No.: WO2020/157685
PCT Pub. Date: Aug. 6, 2020

(65) Prior Publication Data
US 2022/0099476 A1    Mar. 31, 2022

Related U.S. Application Data

(60) Provisional application No. 62/798,973, filed on Jan. 30, 2019.

(51) Int. Cl.
G01G 3/14         (2006.01)
A47J 27/086    (2006.01)
G01G 3/18         (2006.01)

(52) U.S. Cl.
CPC .......... *G01G 3/1418* (2013.01); *A47J 27/086* (2013.01); *G01G 3/18* (2013.01)

(58) Field of Classification Search
CPC ........ G01G 3/1418; G01G 3/18; A47J 27/086
See application file for complete search history.

(56) References Cited

U.S. PATENT DOCUMENTS 6,022,572 A * 2/2000 Winter .................... A47J 27/62
99/335
2009/0209537 A1 8/2009 Shiotsu et al.
(Continued)

FOREIGN PATENT DOCUMENTS

CN    203274880 U    11/2013
CN    108051049 A    5/2018
(Continued)

OTHER PUBLICATIONS

Translation of KR-100755463-B1 (Year: 2007).*
(Continued)

*Primary Examiner* — Elizabeth M Kerr
(74) *Attorney, Agent, or Firm* — KDW FIRM PLLC

(57) ABSTRACT

Scales for use with cooking appliances such as pressure cookers, and associated systems and methods, are disclosed herein. In several implementations, a scale includes load cells configured to detect a weight of a cooking appliance placed on the scale and any food therein. The scale can further include temperature sensors positioned proximate to corresponding ones of the load cells and configured to detect the temperature proximate to each of the load cells. A processor within or external to the scale is communicatively coupled to the load cells and the temperature sensors, and is configured to determine the weight of the cooking appliance and food based at least in part on the detected weights and the detected temperatures.

12 Claims, 10 Drawing Sheets

(56) References Cited

U.S. PATENT DOCUMENTS

| | | | | |
|---|---|---|---|---|
| 2010/0089152 A1* | 4/2010 | Kolada | ................. | G01G 21/28 |
| | | | | 73/426 |
| 2015/0305543 A1 | 10/2015 | Matarazzi et al. | | |
| 2018/0093630 A1 | 4/2018 | Koike | | |
| 2019/0170566 A1* | 6/2019 | Eger | .................... | G01G 3/1418 |
| 2019/0174944 A1* | 6/2019 | Luo | ...................... | A47J 27/004 |

FOREIGN PATENT DOCUMENTS

| | | | | | |
|---|---|---|---|---|---|
| CN | 108344491 A | | 7/2018 | | |
| DE | 102005052274 A1 | | 5/2007 | | |
| DE | 202006020921 U1 | * | 7/2011 | ............ | G01G 21/28 |
| JP | 61149828 A | * | 7/1986 | | |
| JP | 8-42854 A | | 2/1996 | | |
| JP | 2005-198866 A | | 7/2005 | | |
| KR | 100755463 B1 | * | 9/2007 | | |
| WO | 2018/001886 A1 | | 1/2018 | | |
| WO | 2018019766 A1 | | 2/2018 | | |

OTHER PUBLICATIONS

Translation of JP-61149828-A (Year: 1986).*
Translation of DE-202006020921-U1 (Year: 2011).*
International Search Report and Written Opinion, mailed Mar. 24, 2020, for International Application No. PCT/IB2020/050718, 12 pages.
The Extended European Search Report dated Sep. 16, 2022, for Application No. 20748279.5 (eight (8) pages).

* cited by examiner

SCALES, SUCH AS FOR USE WITH COOKING APPLIANCES

RELATED APPLICATION

This application claims priority from U.S. Provisional Patent Application No. 62/798,973, filed 30 Jan. 2019, the contents of which is herein incorporated by reference in its entirety.

BACKGROUND

Scales, such as kitchen scales, often include one or more load cells configured to output an electrical signal having a magnitude proportional to the weight of an item (e.g., food product) placed on the scale. For many load cells, the electrical signal output varies based on the temperature of the load cell and, accordingly, the temperature of the scale can affect the measured weight of the item placed thereon. Some temperature-compensated load cells are specifically designed to account for temperature changes to thereby provide accurate weight measurements at different temperatures. However, such loads cells are often accurate only when the temperature of the load cell is stable, and inaccurate during transient temperature changes.

Accordingly, some scales that are intended for use in variable-temperature environments—such as near a heat source in a kitchen—include active cooling components (e.g., fans) and/or are designed such that the load cells are positioned far from the heat source for maintaining the load cells at a generally constant temperature. However, such scales typically have a large footprint to enable the load cells to be positioned far away from the heat source and/or to incorporate the active cooling components.

SUMMARY

It is an object of the present invention to substantially overcome or at least ameliorate one or more disadvantages of existing arrangements.

In one aspect there is a provided a scale comprising: multiple load cells, wherein each load cell is configured to detect a weight of an item positioned on the scale; multiple temperature sensors, wherein each temperature sensor is configured to detect a temperature proximate to a corresponding one of the load cells; and a processor communicatively coupled to the load cells and the temperature sensors, wherein the processor is configured to determine a temperature compensated weight of the item positioned on the scale based at least in part on the detected weights and the detected temperatures.

In certain embodiments, the scale further comprises a heat sink, wherein the load cells are mounted to the heat sink, and wherein the temperature sensors are mounted to the heat sink.

In certain embodiments, the scale further comprises multiple analog-to-digital converters (ADCs), wherein each ADC is (a) electrically coupled to the processor and to a corresponding one of the load cells and (b) configured to transmit a digital signal to the processor representative of the weight detected by the corresponding one of the load cells.

In certain embodiments, the processor is configured to receive, from individual ones of the load cells, a signal representative of the weight detected by the respective load cell.

In certain embodiments, the multiple load cells include four load cells positioned generally symmetrically about a longitudinal axis.

In certain embodiments, the scale further comprises: an enclosure, wherein the load cells and the temperature sensors are mounted within the enclosure, and wherein the enclosure includes an opening extending through a lower portion thereof; and a flexible barrier coupled to the enclosure over the opening, wherein the load cells are operably coupled to the flexible barrier, and wherein the flexible barrier is configured to inhibit fluid from entering the enclosure through the opening.

In certain embodiments, each of the temperature sensors are secured to the corresponding ones of the load cells.

In a further aspect there is provided a scale comprising: an enclosure having a lower portion and an upper portion, wherein the lower portion includes an opening extending therethrough; a flexible membrane coupled to the lower portion of the enclosure and extending across the opening, wherein the membrane is configured to inhibit fluid from entering the enclosure through the opening; and load cells mounted within the enclosure and operably coupled to the membrane, wherein individual ones of the load cells are configured to detect a weight of an item positioned on the upper portion of the enclosure.

In certain embodiments, individual ones of the load cells include a foot extending at least partially through the opening in the lower portion of the enclosure.

In certain embodiments, the scale further comprises a heat sink positioned within the enclosure, wherein the load cells are mounted to the heat sink.

In certain embodiments, individual ones of the load cells include a first portion mounted to the heat sink and a second portion extending at least partially through the opening in the lower portion of the enclosure.

In certain embodiments, the scale further comprises temperature sensors, wherein individual ones of the temperature sensors are positioned proximate to a corresponding one of the load cells and configured to detect a temperature proximate to the corresponding one of the load cells.

In certain embodiments, the scale further comprises a processor communicatively coupled to the load cells and the temperature sensors, wherein the processor is configured to determine a temperature compensated weight of the item positioned on the scale based at least in part on the detected weights and the detected temperatures.

In another aspect, there is provided a cooking system comprising: a cooking appliance; and a base, wherein the cooking appliance is configured to be removably positioned on the base and to receive and cook a food product, and wherein the base includes: multiple load cells, wherein individual ones of the load cells are configured to detect a weight of the food product; multiple temperature sensors, wherein individual ones of the temperature sensors are positioned proximate to a corresponding one of the load cells and configured to detect a temperature proximate to the corresponding one of the load cells; and a processor communicatively coupled to the load cells and the temperature sensors, wherein the processor is configured to: receive the detected weights and the detected temperatures; and determine a temperature compensated weight of the food product based at least in part on the detected weights and the detected temperatures.

In certain embodiments, the cooking appliance is a pressure cooker.

In certain embodiments, the processor is configured to determine the temperature compensated weight of the food product as the temperature of the food product changes during cooking.

In certain embodiments, the cooking appliance is configured to be communicatively coupled to the base when the cooking appliance is positioned on the base, and wherein the base includes a user input device configured to receive a user input for changing a cooking parameter of the cooking appliance.

In certain embodiments, the detected weights from the load cells are not combined prior to receipt by the processor.

In certain embodiments, the base further includes: an enclosure, wherein the load cells and the temperature sensors are mounted within the enclosure, and wherein the enclosure includes an opening extending through a lower portion thereof; and a silicone membrane coupled to the enclosure over the opening, wherein the load cells are operably coupled to the silicone membrane.

In another aspect there is provided a method of weighing an item, the method comprising: detecting, via multiple load cells, weights of the item; detecting, via multiple temperature sensors positioned proximate to corresponding ones of the load cells, temperatures proximate to the corresponding ones of the load cells; and determining a temperature compensated weight of the item based on the detected weights and the detected temperatures.

In certain embodiments, determining the weight of the item includes determining the weight of the item over a time period in which a temperature of the load cells changes.

In certain embodiments, the method further comprises thermally coupling the load cells to a heat sink, and thermally coupling the temperature sensors to the heat sink.

In certain embodiments, determining the temperature compensated weight of the item includes individually processing the detected weights from the load cells.

In a further aspect, there is provided a cooking appliance configured to receive and cook a food product, wherein the cooking appliance includes: multiple load cells, wherein individual ones of the load cells are configured to detect a weight of the food product; multiple temperature sensors, wherein individual ones of the temperature sensors are positioned proximate to a corresponding one of the load cells and configured to detect a temperature proximate to the corresponding one of the load cells; and a processor communicatively coupled to the load cells and the temperature sensors, wherein the processor is configured to: receive the detected weights and the detected temperatures; and determine a temperature compensated weight of the food product based at least in part on the detected weights and the detected temperatures.

In certain embodiments, the cooking appliance is a pressure cooker.

In certain embodiments, the processor is configured to determine the temperature compensated weight of the food product as the temperature of the food product changes during cooking.

In certain embodiments, the detected weights from the load cells are not combined prior to receipt by the processor.

Other aspects and embodiments will be appreciated throughout the detailed description of the preferred embodiments.

BRIEF DESCRIPTION OF THE DRAWINGS

Example embodiments should become apparent from the following description, which is given by way of example only, of at least one preferred but non-limiting embodiment, described in connection with the accompanying figures. The components in the drawings are not necessarily to scale. Instead, emphasis is placed on clearly illustrating the principles of the present technology.

DETAILED DESCRIPTION

Figure 1A:
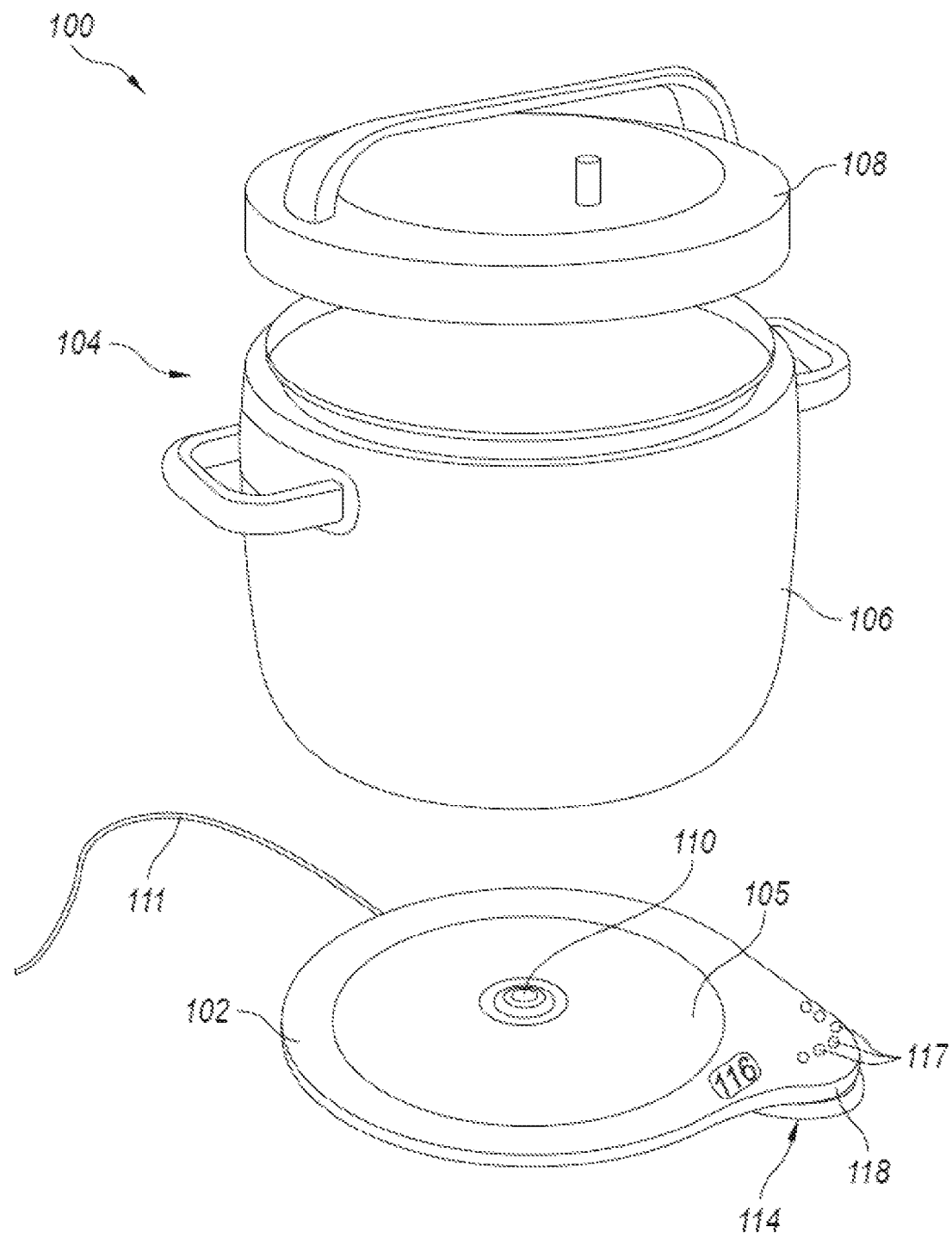
FIGS. 1A and 1B are partially-exploded top and bottom perspective views, respectively, of an example cooking system.

Aspects of the present technology are directed generally toward scales and, in particular, to scales configured for use with pressure cookers and/or other cooking appliances, such as pans, woks, simple containers, bread makers, ice cream makers, food processors with heating elements etc. In exemplary implementations of the present technology described below, a scale includes or comprises load cells each configured to detect a weight of an item placed on the scale and temperature sensors configured to detect a temperature proximate to corresponding load cells. The term "proximate" in this context means that each temperature sensor is located sufficiently close to obtain an estimated measurement of a respective one of the load cells. The load cells and temperature sensors communicate with a processor that receives the respective detected weights and temperatures and determines the weight (i.e. a temperature compensated weight) of the item positioned on the scale based on the detected weights and the detected temperatures. More particularly, the processor can compensate for temperature-induced fluctuations in the output signals from the load cells based on the detected temperature information. In some implementations, the processor receives and processes the individual outputs from the load cells—that is, the output signals from the load cells are not combined before being transmitted to the processor.

In some implementations, a cooking appliance (e.g., a pressure cooker) can be placed on the scale while the cooking appliance is operated to cook a food product, and the scale can accurately determine the weight of the food product even as the cooking appliance generates heat that is conducted to the scale and the load cells. For example, the processor can correct the output of the load cells based on the detected temperatures of the load cells. Because the scale is configured to account for temperature fluctuations, the scale can be made relatively small and compact compared to existing scales because the load cells need not be located distant from a heat source and the scale avoids active cooling components to minimize temperature effects.

In an alternate embodiment, the scale including the load cells, the temperature sensors, and the processor are integrated in the appliance, such as a heatable mixer, so that the appliance does not need to be removably positioned on the scale. In particular, a cooking appliance can be provided which is configured to receive and cook a food product. The cooking appliance can include multiple load cells, wherein individual ones of the load cells are configured to detect a weight of the food product. Furthermore, the cooking appliance includes multiple temperature sensors, wherein individual ones of the temperature sensors are positioned proximate to a corresponding one of the load cells and configured to detect a temperature proximate to the corresponding one of the load cells. The cooking appliance further includes a processor communicatively coupled to the load cells and the temperature sensors, wherein the processor is configured to: receive the detected weights and the detected temperatures; and determine a temperature compensated weight of the food product based at least in part on the detected weights and the detected temperatures. In certain embodiments, the cooking appliance can be provided in the form of a pressure cooker. The processor can be configured to determine the temperature compensated weight of the food product as the temperature of the food product changes during cooking. The detected weights from the load cells are not combined prior to receipt by the processor.

Certain details are set forth in the following description and in FIGS. 1A-8 to provide a thorough understanding of various implementations of the present technology. In other instances, well-known structures, materials, operations, and/or systems often associated with scales, electrical systems, etc., are not shown or described in detail in the following disclosure to avoid unnecessarily obscuring the description of the various implementations of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of implementations of the technology. Indeed, certain terms may even be emphasized below; however, any terminology intended to be interpreted in any restricted manner will be overtly and specifically defined as such in this Detailed Description section.

The accompanying Figures depict implementations of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular implementations of the disclosure. Accordingly, other implementations can have other details, dimensions, angles and features without departing from the spirit or scope of the present invention. In addition, those of ordinary skill in the art will appreciate that further implementations of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1B:
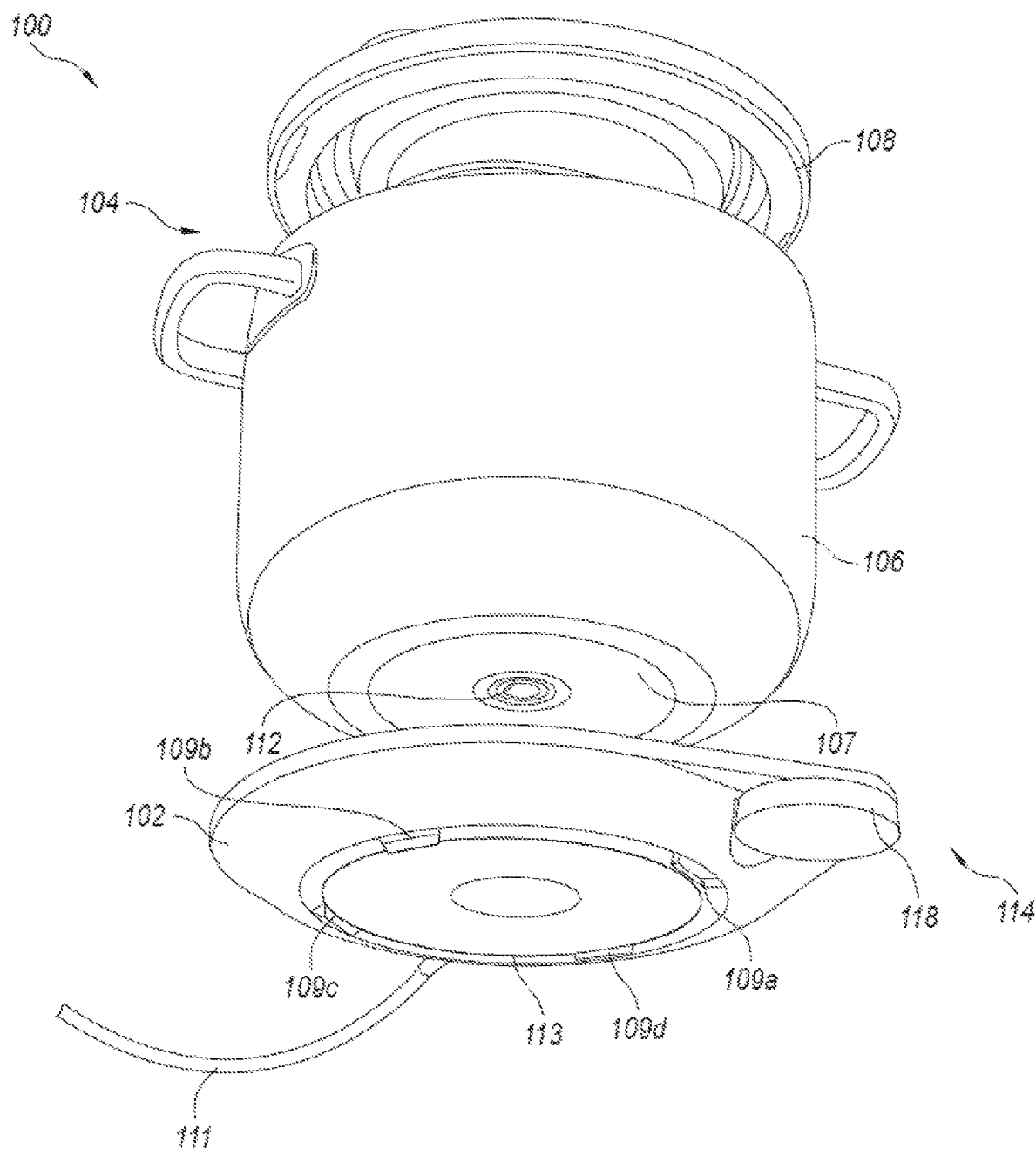

FIGS. 1A and 1B are partially-exploded top and bottom perspective views, respectively, of an example cooking system 100. Referring to FIGS. 1A and 1B together, the cooking system 100 includes a base 102 and a cooking appliance 104. As illustrated, the cooking appliance 104 is a pressure cooker for heating and cooking food under pressure and includes a pot 106 and a lid 108 configured to be releasably secured to the pot 106. In other implementations, the cooking appliance 104 can be a device other than a pressure cooker and/or may include only the pot 106. For example, the cooking appliance 104 can be a simple container, a pan (e.g., a frying pan), a bread maker, rice cooker, or other vessel for holding, heating and/or cooking food.

The cooking appliance 104 is configured to be positioned on and operably coupled to the base 102, for example, during cooking of a food product within the cooking appliance 104. More specifically, the base 102 can include an upper surface 105 configured to engage a lower surface 107 of the pot 106 when the cooking appliance 104 is positioned on the base 102. The upper surface 105 of the base 102 can include an indentation or other features configured to mate or engage with corresponding features on the lower surface 107 of the cooking appliance to secure the cooking appliance 104 to the base 102 and to inhibit the cooking appliance 104 from moving (e.g., horizontally or rotationally) relative to the base 102. As illustrated, the base 102 includes a connector 110, at the upper surface 105, configured to mate with a corresponding connector 112 at the lower surface 107 of the pot 106. The pot 106 and the base 102 can be electrically and/or communicatively coupled together via the connectors 110, 112 when the cooking appliance 104 is positioned on the base 102.

As illustrated, the base 102 can be electrically coupled to a power source (e.g., an AC power source, a wall outlet, etc.) via a power cord 111. Alternatively or additionally, the base 102 can include one or more batteries for powering the base 102. The base 102 can further include a user interface portion 114 configured to provide information to and/or receive information from a user regarding operation of the cooking appliance 104 when the cooking appliance 104 is positioned on the base 102. The user interface portion 114 can include a display 116, one or more light-emitting diodes (LEDs) 117, a user input device (e.g., scroll wheel 118), and/or other components. The display 116 can include an LED array for displaying words, numbers, and/or other symbols indicative of a cooking setting, parameter, condition, etc., of the cooking appliance 104, such as a mode (e.g., sear, reduce, etc.), a temperature, a cooking time, a pressure, a state, or other characteristic of the cooking appliance 104. Likewise, the LEDs 117 can be selectively illuminated to display a temperature setting, a mode, a power setting, a pressure setting, a fill level, or other parameter of the cooking appliance 104. Similarly, the scroll wheel 118 and/or another user input device (e.g., a microphone, a touch screen, a mouse, a button, a slider, etc.) can be operated by the user to select a temperature, a power, a pressure, a cooking time, etc., of the cooking appliance 104.

As described in greater detail below with reference to FIGS. 3-6, the base 102 can be configured as a scale for detecting/determining a weight of the cooking appliance 104, food and liquids (e.g., a food product) placed therein, and/or other items positioned on the base 102. More specifically, the base 102 can include multiple feet 109 (individually labeled as first through fourth feet 109a-109d) which engage a surface (e.g., a kitchen counter) during operation. The base 102 can include load cells positioned at and/or adjacent to the feet 109 for detecting the weight of the cooking appliance 104 and any contents therein, and one or more processors for determining/estimating the weight based on the output of the load cells. The measured weight can be displayed via the user interface portion 114. As illustrated, each of the feet 109 are positioned along/behind a barrier or membrane 113 that is configured to inhibit or even prevent fluids from entering the base 102. The membrane can be made of flexible planar material, such as any of the various types of plastic sheeting, as described below. In other implementations, the membrane 113 can be omitted and the feet 109 and/or the load cells can directly contact a surface during operation of the cooking system 100. Moreover, in other implementations the base 102 can include more or fewer than the illustrated four feet.

In some implementations, the base 102 is configured to identify the cooking appliance 104 when the cooking appliance 104 is positioned on and/or or proximate to the base 102. For example, the cooking appliance 104 (e.g., the pot 106) can include a radio-frequency identification (RFID) or other wireless tag that can be read by the base 102 to identify the cooking appliance 104 (or another cooking appliance). In some implementations, the base 102 can access information about the cooking appliance 104 after identifying the cooking appliance 104—for example, an anticipated weight of the cooking appliance 104 (e.g. based on a prior taring of the appliance), the last time the cooking appliance 104 was used with the base 102, etc.

Figure 2:
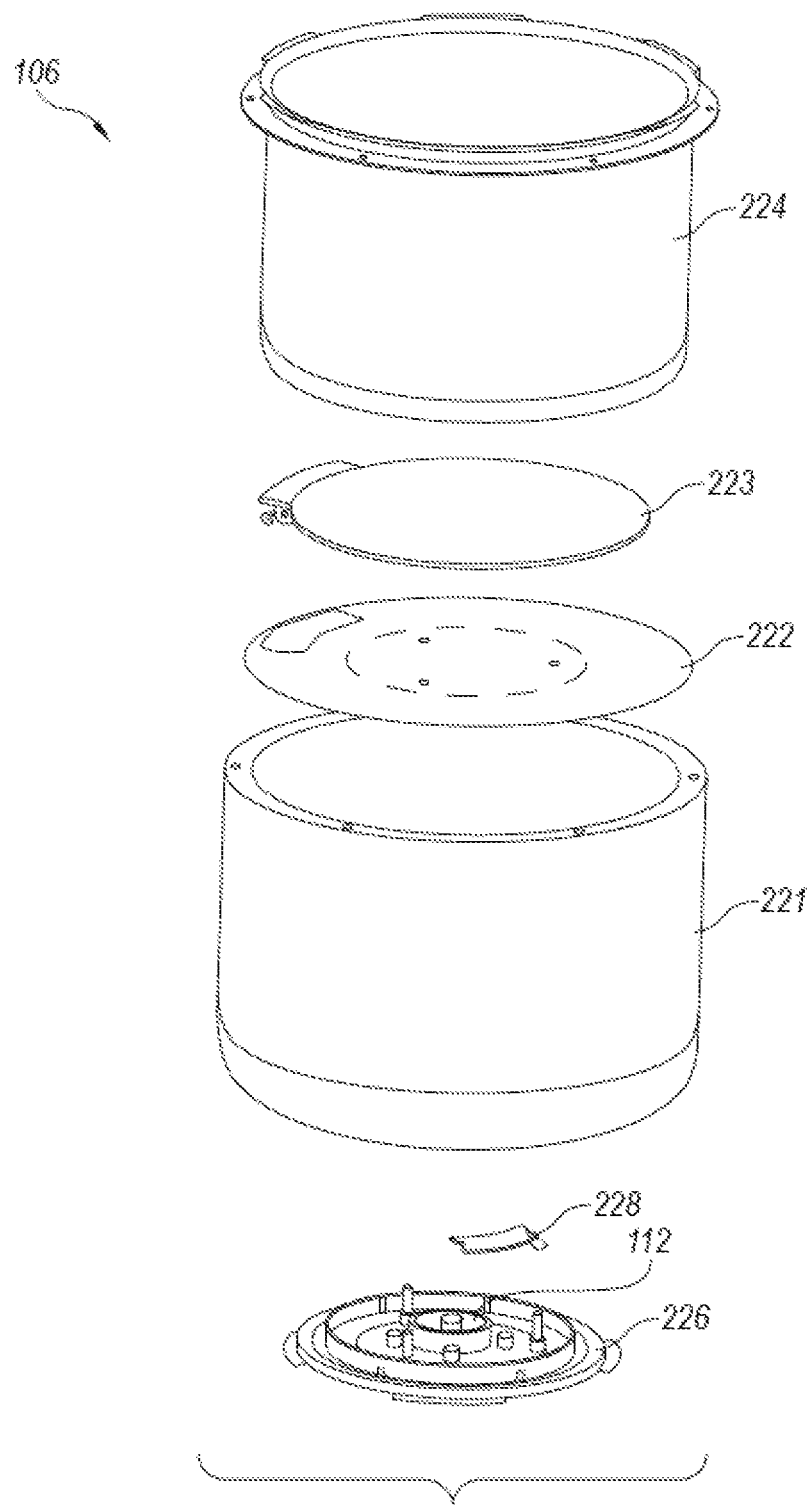
FIG. 2 is an exploded view of a pot of the cooking system shown in FIGS. 1A and 1B.

FIG. 2 is an exploded view of the pot 106 of the cooking system 100. As illustrated, the pot 106 includes an outer pot 221, a heat shield 222 positioned in the outer pot 221, and an electric heating element 223 positioned on and/or adjacent to the heat shield 222 in the outer pot 221. An inner pot 224 is formed of heat conductive metal and is configured to be positioned at least partially within the outer pot 221 and to receive food, liquids, and/or other ingredients therein. The heating element 223 is positioned below the bottom of the inner pot 224 to heat food, etc., within the inner pot 224. The pot 106 can further include a bottom portion or cover 226 configured to be coupled to the outer pot 221 and to enclose (e.g., carry, secure, etc.) electronics for operating the cooking appliance 104 and/or for communicating with the base 102. As illustrated, the bottom portion 226 encloses a circuit board 228 (e.g., a printed circuit board) communicatively coupled to the connector 112. In some implementations, during operation of the cooking system 100, the circuit board 228 receives signals from the base 102 indicative of selected cooking settings/parameters and controls for operating the pot 106.

Figure 3:
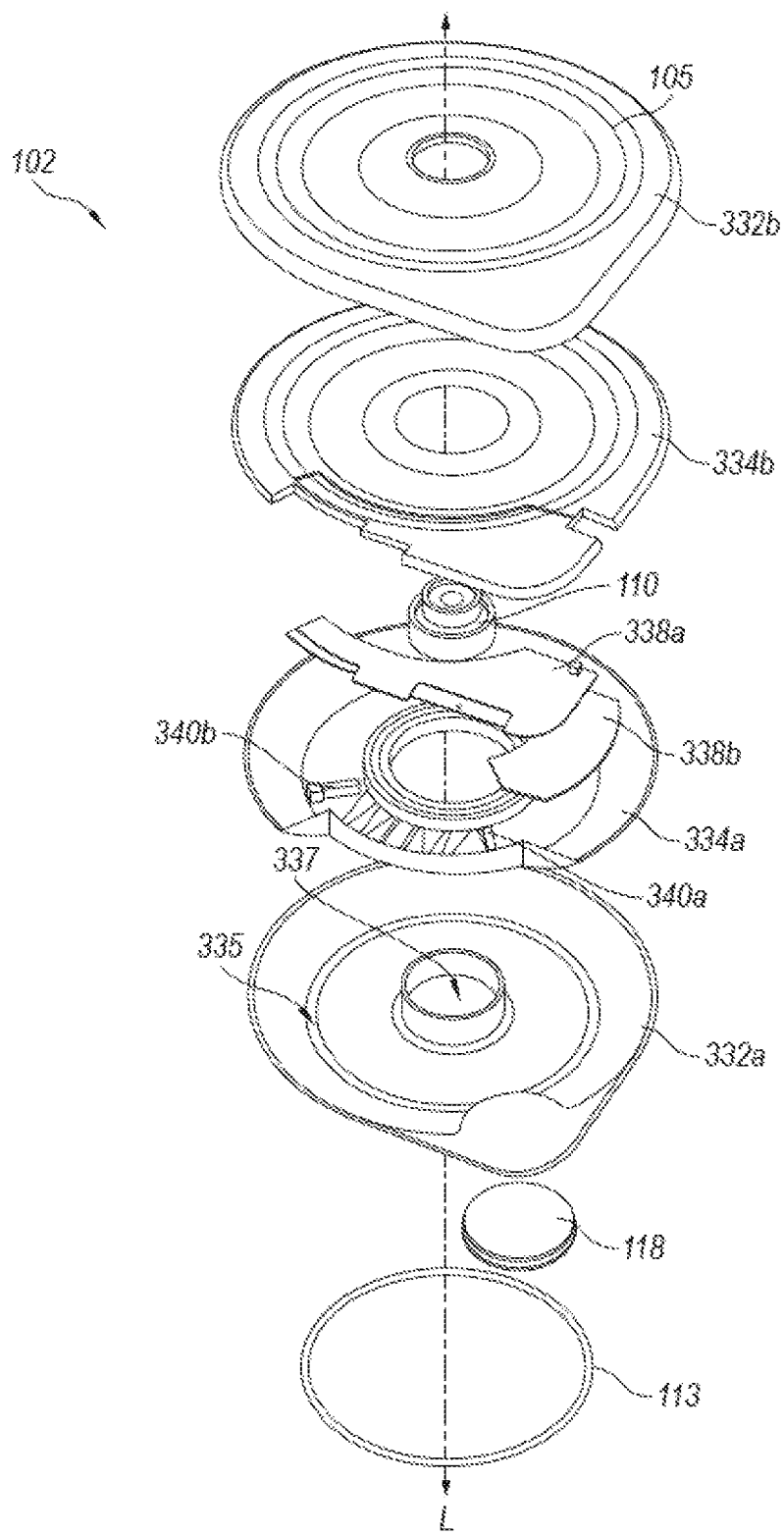
FIG. 3 is an exploded view of a base of the cooking system shown in FIGS. 1A and 1B.

FIG. 3 is an exploded view of the base 102 of the cooking system 100. As illustrated, the base 102 includes or comprises a lower enclosure/portion 332a and an upper enclosure/portion 332b. The enclosures 332 can be formed from a plastic material and are secured to one another via, for example, an adhesive, a mating connection, a welded bond, etc., such that they form an exterior surface of the base 102 and enclose the internal components of the base 102. As illustrated, a lower heat sink 334a and an upper heat sink 334b are positioned between the enclosures 332, and circuit boards 338 (individually labeled as a first circuit board 338a and a second circuit board 338b) are positioned between the heat sinks 334. In other implementations, the base 102 can include additional electrical components positioned within the enclosures 332. The heat sinks 334 can be formed from a metal material (e.g., diecast aluminum) or other suitably thermally conductive material and are configured to at least partially dissipate/disperse heat generated by the circuit boards 338 and/or the cooking appliance 104 (e.g., heat generated by the heating element 223; FIG. 2).

As illustrated, the connector 110 is partially positioned within a recess 337 in the lower enclosure 332a and extends through apertures (e.g., central openings concentrically aligned about a longitudinal axis L) formed in the heat sinks 334 and the upper enclosure 332b such that the connector 110 is externally accessible at the upper surface 105. The connector 110 is electrically coupled to one or both circuit boards 338 for receiving/transmitting signals from/to the cooking appliance 104 (FIGS. 1A and 1B). In some implementations, the first circuit board 338a includes control/logic circuitry while the second circuit board 338b includes circuitry for interfacing with a power supply via, for example, the power cord 111 (FIGS. 1A and 1B). As further shown in FIG. 3, the base 102 includes load cells 340 (individually labeled as first through fourth load cells 340a-340d; only the first and second load cells 340a, b are visible in FIG. 3) between the heat sinks 334. The load cells 340 can be communicatively (e.g., electrically) coupled to one or both circuit boards 338 and, as described in greater detail below, each of the load cells 340 is configured to individually detect the weight of an object (e.g., the cooking appliance 104) positioned on the base 102.

As illustrated, an opening or channel 335 extends through the lower enclosure 332a. At least a portion of the load cells 340 can extend through the opening 335 to directly or indirectly contact a surface (e.g., a kitchen counter) such that the weight of the cooking appliance 104 or other object placed on the base 102 is substantially transmitted to the load cells 340 (e.g., instead of to and through the enclosures 332). Although illustrated as a continuous opening in FIG. 3, the opening 335 can comprise one or more discrete openings extending through the lower enclosure 332a. For example, in some implementations the lower enclosure 332a can include multiple, smaller openings at least partially beneath corresponding ones of the load cells 340.

As illustrated, the membrane 113 is coupled to the lower enclosure 332a such that it extends across and seals the opening 335. The membrane 113 can comprise a rubber (e.g., silicone) or other flexible and waterproof material, and is configured to inhibit or even prevent fluid from entering through the opening 335 where it could potentially damage the circuit boards 338, load cells 340, and/or other electronics within the base 102. For example, the membrane 113 can inhibit water from entering the base 102 when a user washes the base 102. In general, the membrane 113 can be configured (e.g., shaped and sized) to correspond to the configuration of the opening 335. For example, while the membrane 113 has a generally circular- or ring-like shape in FIG. 3, in other implementations the membrane 113 can comprise multiple discrete (e.g., silicone) components configured to be coupled to the lower enclosure 332a over corresponding discrete openings in the base 102.

Figure 4A:
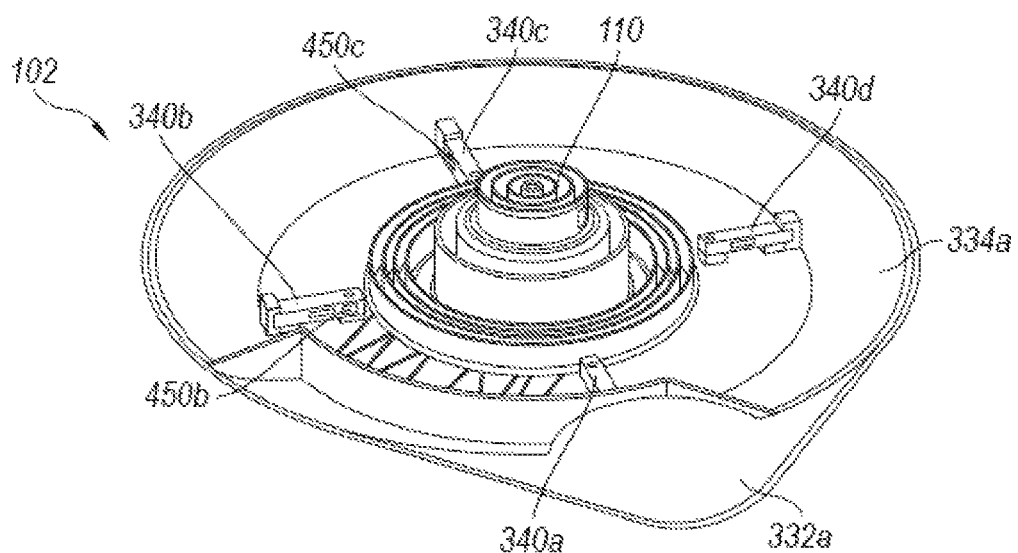
FIGS. 4A and 4B are an isometric view and a top view, respectively, of the base of FIG. 3.
Figure 4B:
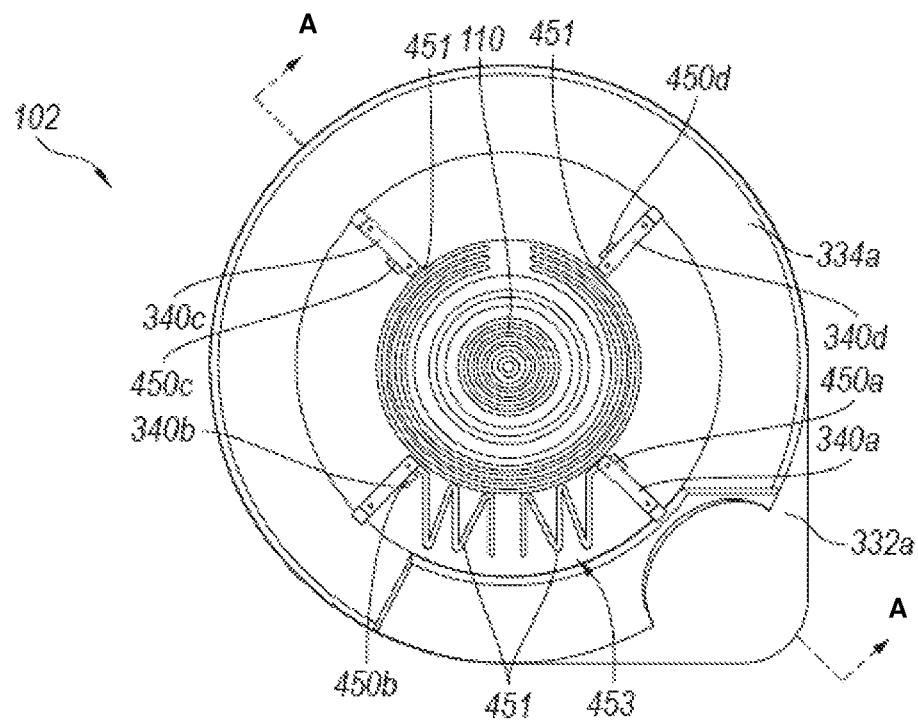

FIGS. 4A and 4B are an isometric view and a top view, respectively, of the base 102 and with the upper enclosure 332b, the upper heat sink 334b, and the circuit boards 338 removed for the sake of clarity. Referring to FIGS. 4A and 4B together, the load cells 340 (represented as 340a, 340b, 340c, 340d) can be thermally coupled to the lower heat sink 334a such that the load cells 340 are thermally coupled to one another via the lower heat sink 334a. Accordingly, the lower heat sink 334a can facilitate the even distribution of heat (e.g., from the cooking appliance 104 and/or the circuit boards 338) among the load cells 340 so that, for example, the load cells 340 operate at generally the same temperature. In general, the features and configurations of the load cells 340 can be generally similar or identical. For example, as illustrated, the load cells 340 are identical bending-beam load cells that are mounted to the lower heat sink 334a generally symmetrically (e.g., in different quadrants) about the longitudinal axis L (FIG. 3). The load cells 340 can each be electrically connected to one or both of the circuit boards 338 via wiring 451. In some implementations, the wiring 451 can include a serpentine portion 453 connected to one or more of the load cells 340 (e.g., the first and second load cells 340a, b) so that the each of the load cells 340 is coupled to the circuit boards 338 via the same length of the wiring 451. This arrangement can ensure that signals from the load cells 340 are not distorted relative to one another due to uneven signal propagation paths.

Figure 4C:
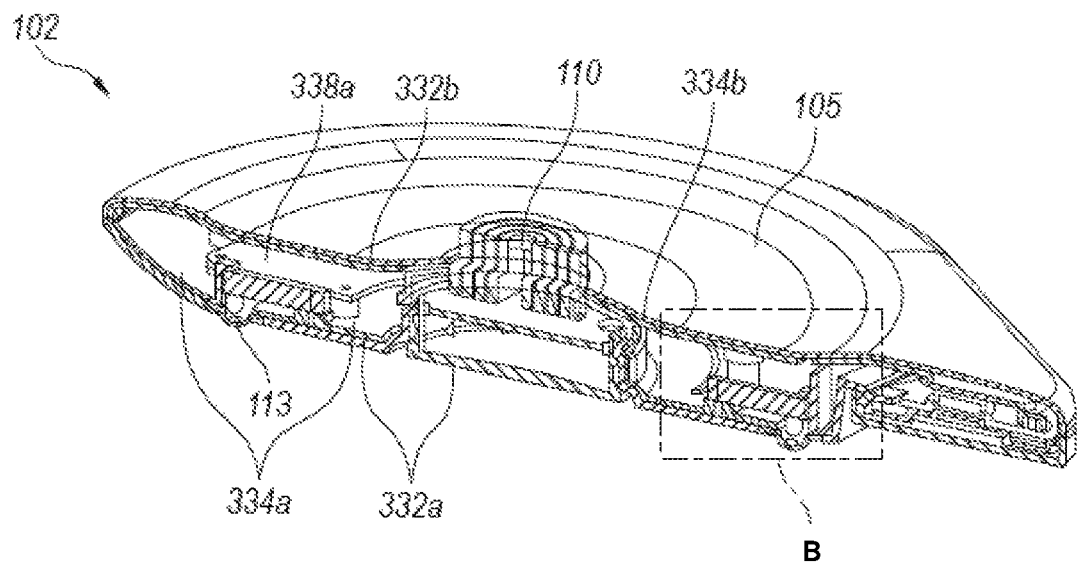
FIG. 4C is an isometric side cross-sectional view of the base taken along line A-A shown in FIG. 4B.
Figure 4D:
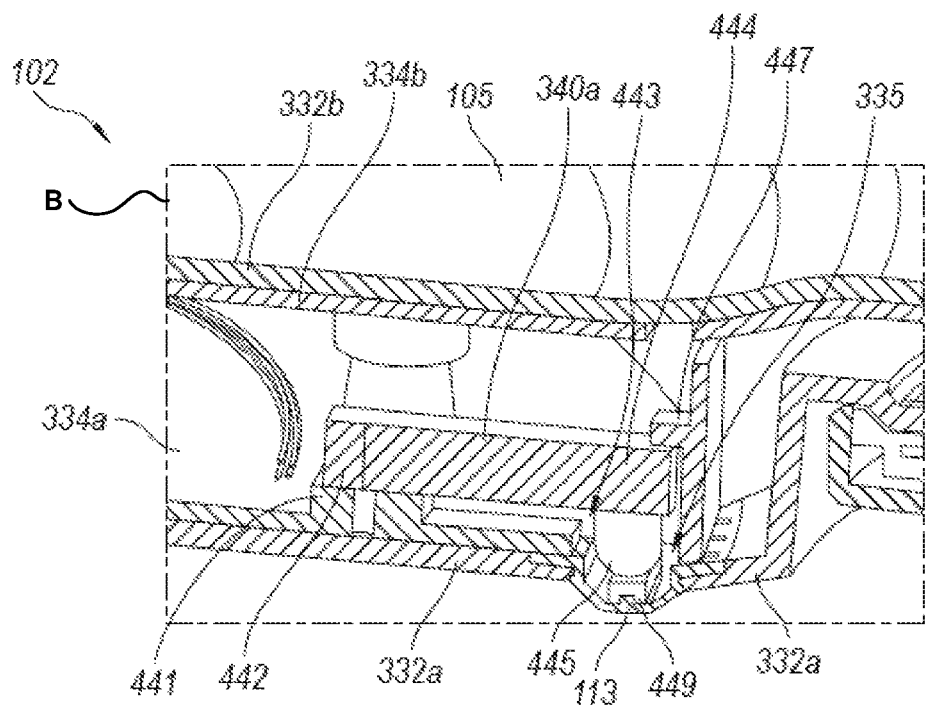
FIG. 4D is an enlarged, isometric side cross-sectional view of a portion B of the base of FIG. 4C.

More particularly, FIG. 4C is an isometric side cross-sectional view of the base 102 taken along the line shown in FIG. 4B, and FIG. 4D is an enlarged, isometric side cross-sectional view of a portion of the base 102 shown in FIG. 4C and illustrating the first load cell 340a. As best seen in FIG. 4D, the first load cell 340a includes a first portion 442 that is fixedly coupled to the lower heat sink 334a (e.g., to a mount or projection 441 of the lower heat sink 334a) and a second portion 444 that projects from the first portion 442 such that the first load cell 340a is cantilevered relative to the lower heat sink 334a. The second portion 444 further includes a foot 445 integrally formed with or coupled thereto. The foot 445 is configured to extend (i) through an opening or aperture 443 (e.g., a rectangular opening) in the lower heat sink 334a and (ii) at least partially through the opening 335 in the lower enclosure 332a. A tab 447, such as an over-travel hard stop, is positioned above the second portion 444 to prevent excessive loads from damaging the first load cell 340a. The tab 447 can be a portion of the upper heat sink 334b or a separate component mounted within the base 102. As illustrated, the foot 445 engages an elongate member 449 and is operably coupled to the membrane 113 via the elongate member 449. The elongate member 449 can form/define a corresponding one of the feet 109 (e.g., the first foot 109a; FIG. 1B) of the base 102. In other implementations, the elongate member 449 can be omitted and the first load cell 340a can directly contact the membrane 113. One of skill in the art will appreciate that the second through fourth load cells 340b-340d can have the same or similar features.

Referring to FIGS. 1B, 4C, and 4D together, when the base 102 is placed on a surface (e.g., a kitchen counter), the feet 109 contact the surface and the weight of the base 102 and any items placed thereon is transmitted to the load cells 340 via the feet 109. In response, each of the load cells 340 bends (e.g., deflects, deforms, etc.) due to the differential force between the fixed first portion 442 and the cantilevered second portion 444. Each of the load cells 340 is further configured to transmit a signal to the first circuit board 338a indicative of this deformation and thus a detected weight of the base 102 and any items placed thereon. That is, each of the load cells 340 is configured to output an electrical signal to the first circuit board 338a having a magnitude that is proportional to the weight of an item (e.g., the cooking appliance 104 and any food therein) positioned on the upper surface 105 of the base 102. In other implementations, the load cells 340 can be other types of load cells such as, for example, piezoelectric load cells.

Referring again to FIGS. 4A and 4B together, the base 102 can further include temperature sensors 450 (individually labeled as first through fourth temperature sensors 450a-450d) communicatively coupled to one or both of the circuit boards 338 (e.g., the first circuit board 338a). The temperature sensors 450 can be thermistors, thermocouples, semiconductor-based sensors, and/or other types of temperature sensors. As illustrated, the temperature sensors 450 are positioned proximate to corresponding ones of the load cells 340 and are configured to detect a temperature proximate to the corresponding ones of the load cells 340. In some implementations, the temperature sensors 450 can be attached to a side of the load cells 340 while, in other implementations the temperature sensors 450 can be mounted to the lower heat sink 334a and/or other structures within the base 102. In other implementations, the number of temperature sensors 450 can be greater or fewer than the number of load cells 340. For example, the base 102 can include fewer temperature sensors 450 than load cells 340 (e.g., single temperature sensors 450 positioned between pairs of the load cells 340).

Figure 5:
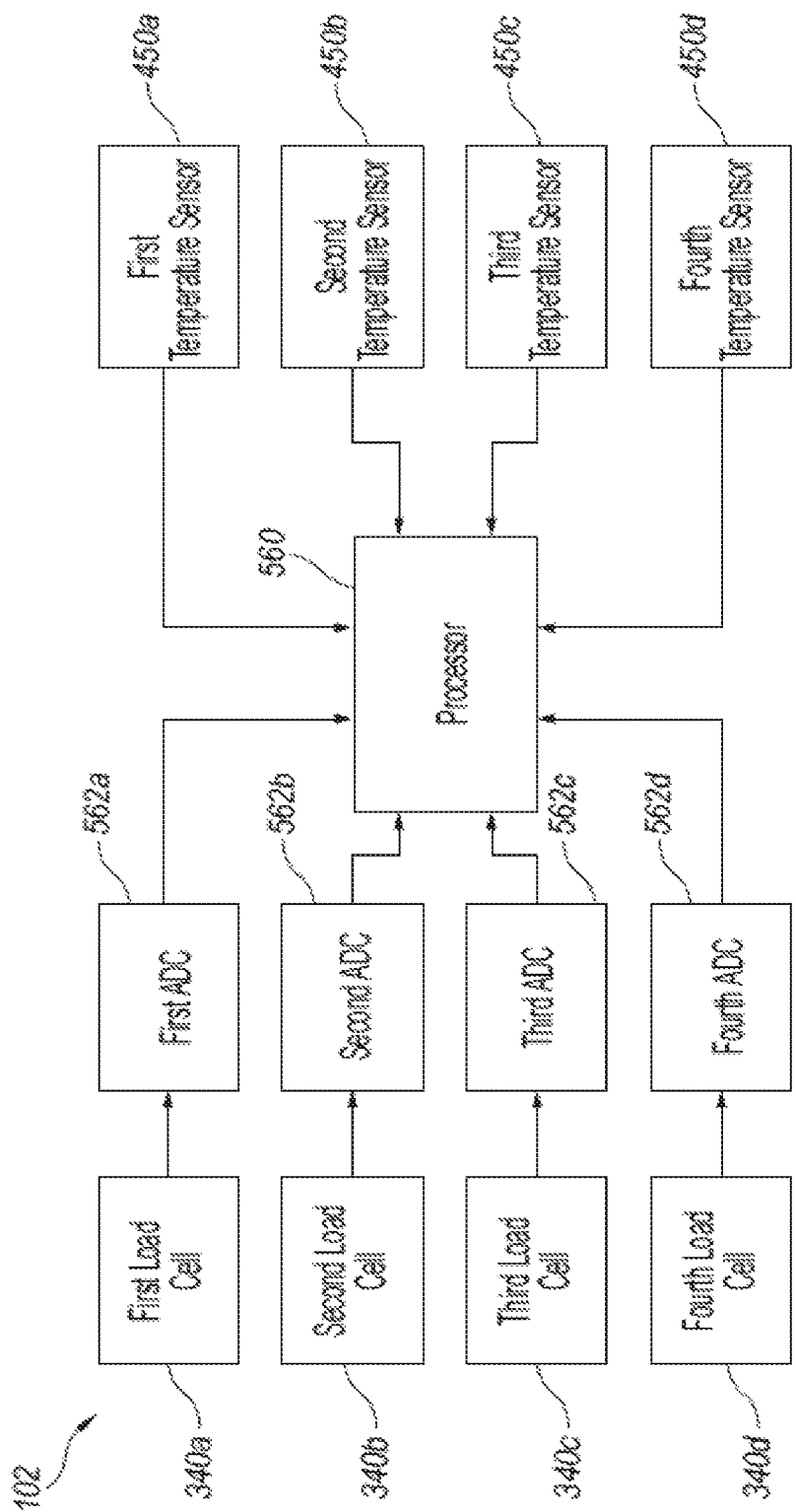
FIG. 5 is a schematic electrical diagram of the base of FIG. 3.

FIG. 5 is a schematic electrical diagram of the base 102. As illustrated, each of the load cells 340a-340d is communicatively (e.g., electrically) coupled to a processor 560 via first through fourth analog-to-digital converters (ADCs) 562a-562d, respectively. The temperature sensors 450 can be directly electrically coupled to the processor 560 while; alternatively, the temperature sensors 450 can be coupled to the processor 560 via corresponding ADCs and/or other electrical components. The processor 560 can comprise one or more components of the first circuit board 338a, the second circuit board 338b, and/or circuitry that is external to the base 102 (e.g., remote computing components; not shown).

In one aspect of the illustrated system, the processor 560 is configured to receive and process the output signals from the load cells 340 and the temperature sensors 450 separately. That is, in contrast to many conventional scales, the signals from the load cells 340 are not combined (e.g., in a single ADC and/or a Wheatstone bridge) prior to processing by the processor 560. As described in greater detail below, the processor 560 is configured to determine the weight of an item placed on the base 102 (e.g., the cooking appliance 104 and any food therein) based on the output signals from the load cells 340 (i.e., detected weights) and the output signals from the temperature sensors 450 (i.e., detected temperatures proximate the load cells 340). By processing the signals from the load cells 340 independently, the processor 560 can compensate for fluctuations in the operating temperatures of the load cells 340 based on the detected temperatures of the load cells 340.

More specifically, when the cooking appliance 104 is positioned on the base 102 and operated to cook a food product, the cooking appliance 104 can generate and conduct to the base 102 a significant amount of heat. For many load cells, the output electrical signal is dependent on the temperature of the load cells as the resistance of wires within the load cells varies with temperature. Therefore, without compensating for temperature, weight measurements based on the load-cell outputs will vary depending on the operating temperature of the load cells. However, as set forth below, the base 102 is specifically configured to compensate/account for changing temperature of the load cells 340 and to provide accurate weight measurements during cooking using the cooking appliance 104.

Figure 6:
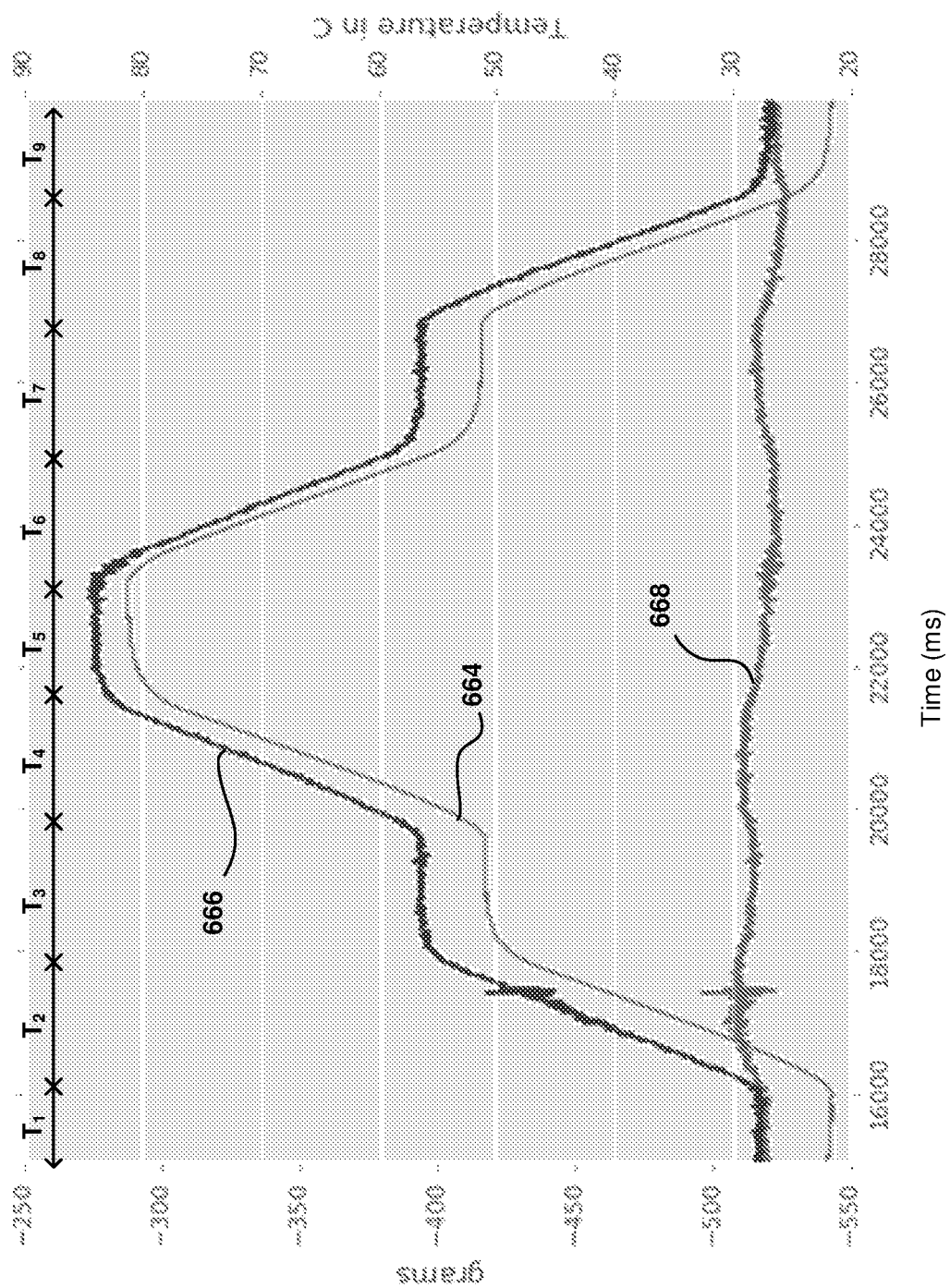
FIG. 6 is a graph illustrating example load cell output over time, a temperature of the item over time, and a determined temperature compensated weight of the item over time.

FIG. 6 is a graph illustrating load-cell output data when a constant load is applied to the load cells whilst temperature is varied over time. The x-axis in FIG. 6 represents time (milliseconds), while the left y-axis in FIG. 6 represents weight (grams) and the right y-axis represents temperature (degrees Celsius).

As illustrated, the plot 664 represents the temperature of the load cells, the plot 666 represents the indicated load (e.g., output corresponding to uncorrected mass) of a non-temperature-compensated load cell (e.g., a half-bridge load cell, quarter-bridge load cell, etc.), and the plot 668 represents the predicted temperature-compensated weight of the load cell. As shown, the temperature of the load cells (i.e., the plot 664) is constant during a first time period $T_1$, then increases linearly during a second time period $T_2$, before remaining constant during a third time period $T_3$ at a higher temperature than during the first time period $T_1$. The temperature of the load cells (i.e., the plot 664) increases linearly during a fourth time period $T_4$, before remaining constant during a fifth time period $T_5$ at a higher temperature that during the first and third time periods. The temperature of the load cells (i.e., the plot 664) then decreases linearly during a sixth time period $T_6$, before remaining constant during a seventh time period $T_7$ at a lower temperature that during the fifth time period. The temperature of the load cells (i.e., the plot 664) then decreases linearly during an eighth time period $T_8$, before remaining constant during a ninth time period $T_9$ at a lower temperature that during the seventh time period. The output signal of the non-temperature-compensated load cell (i.e., the plot 666) is directly proportional to the temperature of the load cell and, in particular, is expected to show a linear change during the second, fourth, sixth, and eighth time periods $T_2$, $T_4$, $T_6$, $T_8$, when the temperature of the load cell is changing. In contrast, the output signal indicative of the temperature-compensated weight of the food item which is generated by the processor is substantially constant over time period $T_1$ to $T_9$ relative to the temperature dependent weight measured by the load cell.

Referring to FIGS. 4A-6 together, because the temperature sensors 450 are positioned proximate to corresponding ones of the load cells 340, the temperature sensors 450 can provide near real-time information about the operating temperatures of the load cells 340. The processor 560 can utilize this information to determine when/if the temperature of one or more of the load cells 340 is changing (e.g., during the time period $T_2$ shown in FIG. 6) and can compensate accordingly. In some implementations, the processor 560 can compensate for the changing temperature of the load cells 340 by applying one or more predetermined models for the temperature-dependency of the load cells 340. In particular, the processor 560 can estimate the weight of the item(s) on the base 102 by applying a non-linear model for the temperature dependency of the load cells 340 to the received signals from the load cells 340. In general, the particular form and magnitude of adjustment/compensation will vary depending on the particular temperature-dependency pattern of the load cells 340 used.

In one implementation, a temperature compensated weight measurement for the item can be calculated by the processor using a non-linear model using output from each ADC 562a-562d and temperature sensors 450a-450d. In particular, let the output of temperature sensor 450i be $T_i$ and the ADC output 562i is a voltage $V_i$, where i=a, b, c, d. Load cell calibration is performed at $T_{cal,i}$. A cubic regression with cross-validation and Tikhonov regularizations at temperature $T_{cal,i}$ is applied to determine regression coefficients $c_{i,0}$, ... $c_{i,3}$ for Equation 1 below:

$$c_{i,0}+c_{i,1}\times V_{i,k}+c_{i,2}\times V_{i,k}^2+c_{i,2}\times V_{i,k}^3=w_{k}+\delta_k \qquad (1)$$

for measurements k=0, 1, ... N, where $V_{i,k}$ is the ADC output for calibration weight $w_k$ at temperature $T_{cal,i}$. In alternate implementations, other regression modelling technique could be used with different regularizations. Furthermore, it will be appreciated that a different order of polynomial could be used. In relation to the example using Tikhonov regularizations, a residual value, δ, is minimised as shown in Equation 2 below:

$$\|\delta\mu_2^2\alpha x\|c_i\|_2^2=\sqrt{(\delta_0^2+\delta_1^2+...+\delta_N^2)}+\alpha\times \sqrt{(c_{i,0}^2+c_{i,1}^2+c_{i,2}^2+c_{i,1}^2)} \qquad (2)$$

where $\alpha\leq 0$ is the regularization parameter.

The regression coefficients $c_{i,0}$, ... $c_{i,3}$ and residual value $\delta_k$ are saved in memory coupled to the processor. Upon receiving uncompensated weight values from the load cells and the temperature values from the temperature sensors, the regression coefficients $c_{i,0}$, ... $c_{i,3}$ and residual value $\delta_k$ are used to determine the temperature compensated weight for the item on the base using Equation 1. In one form, measurements are used to determine a constant parameter $d_i$ (temperature correction factor). In one implementation, the measurements received from the temperature sensor measurements, $T_i$, for i=a, ... d, are used by the processor to initially compensate the load cell voltage $v_i$ to obtain $V_i$ as shown in Equation 3 below:

$$V_i=v_i-d_i\times(T_i-T_{cal,i}) \qquad (2)$$

where:

$$di=(v_{i,2}-v_{i,1})/(T_i-T_{cal,i})$$

In this instance, $T_{i,k}$ and $v_{ik}$ for k=1, 2, are the averaged measurements at two different temperatures, $T_{i,1}\neq T_{i,2}$, with the same weight applied. The processor can also compute the compensated voltage using regression based on multiple temperatures for a series of different weights. In other implementations, a Kalman filter can be applied to the $T_i$ time series to compute a correction $\in_t$. The application of these techniques discussed above is illustrated by the graph of FIG. 6.

Notably, by compensating for the individual operating temperatures of the load cells 340, the base 102 can accurately determine the weight of a food product even while the cooking appliance 104 is operated to cook the food product—and thereby conducts significant heat to the base 102. For example, the base 102 can be used to accurately weigh a sauce over time as the sauce is reduced in the cooking appliance 104. In contrast, in conventional scales in which the outputs of multiple load cells are combined and processed together, the combined signal can vary greatly based on the different operating temperatures of the load cells—increasing the uncertainty of the weight measurement. Moreover, the present technology enables the base 102 to be made relatively small and compact because the load cells 340 need not be located distant from a heat source—such as the cooking appliance 104—so as to minimize the effects of temperature. Likewise, in some implementations the base 102 does not require active cooling components to cool the load cells 340.

Moreover, in some implementations the processor 560 is further configured to compensate for any weight transferred through the membrane 113 to the enclosures 332 instead of to the load cells 340. The membrane 113 can be formed of a material having an elasticity and/or other material characteristic that does not change greatly over the range of normal operating temperatures. Accordingly, the processor 560 can apply a constant correction factor that can, for example, be determined during calibration of the base 102 (e.g., as described in greater detail below with reference to FIG. 7). In other implementations, the processor 560 can process the signals from the temperature sensors 450 and/or from one or more additional temperature sensors (not shown) positioned proximate to the membrane 113 to estimate a temperature and thus elasticity of the membrane 113. The processor 560 can then apply a correction factor based on the estimated elasticity.

Figure 7:
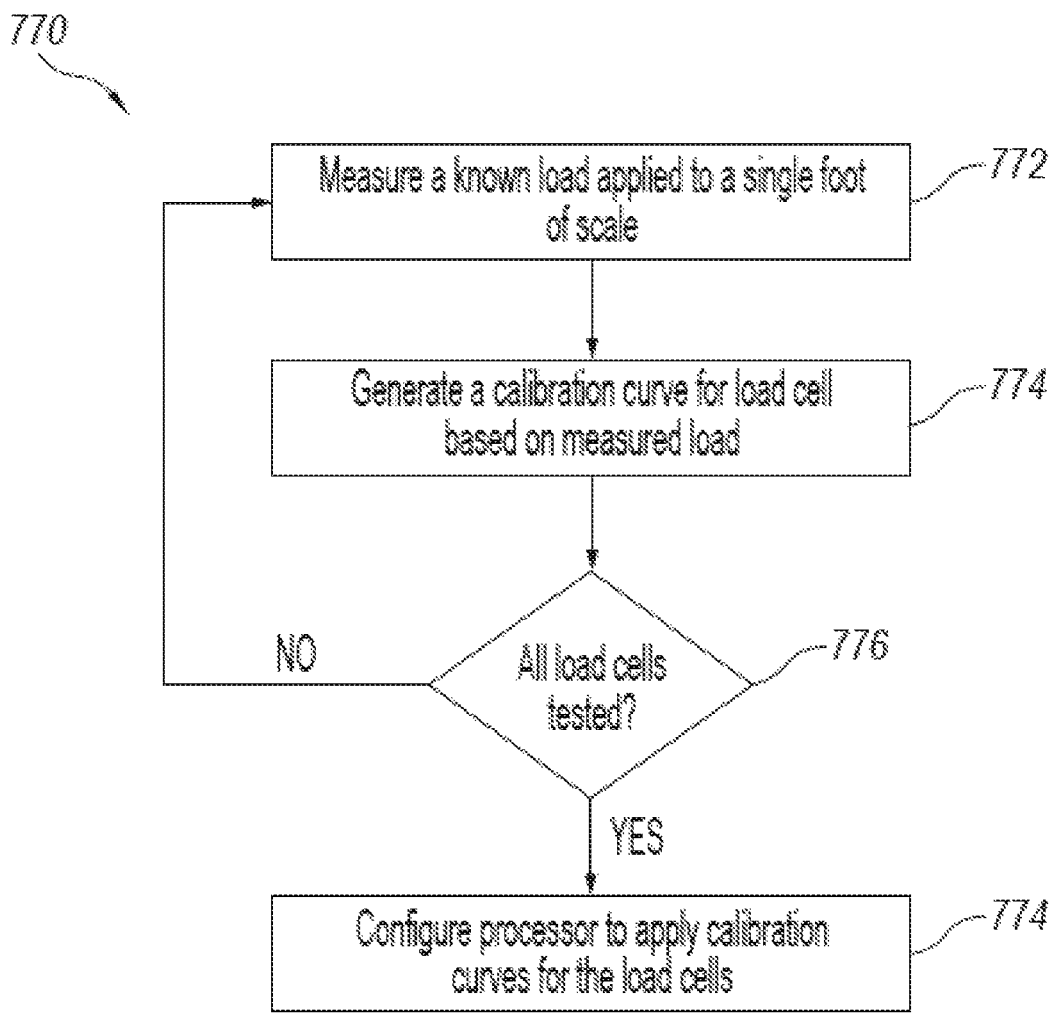
FIG. 7 is a flow diagram of an example process or method for calibrating the base.

FIG. 7 is a flow diagram of a process or method 770 for calibrating the base 102. For the sake of illustration, some features of the method 770 will be described in the context of the implementations shown in FIGS. 1A-5. In general, because each of the load cells 340 in the base 102 is individually coupled to the processor 560 (i.e., the signals from the load cells 340 are not combined), each of the load cells 340 must be individually calibrated to account for manufacturing differences. Therefore, in contrast to conventional scales in which the outputs from multiple load cells are combined, the base 102 cannot be calibrated simply by applying a known load to, for example, the upper surface 105 of the base 102.

Accordingly, at block 772 the method 770 includes measuring a known load applied to one of the feet 109 of the base 102. In particular, the output of the load cell 340 operably coupled to the foot 109 can be measured for a single load of known force, or for multiple loads of known force (e.g., a minimum or zero load, a maximum load, and/or any loads therebetween). In some implementations, the base 102 can be flipped over (e.g., such that the upper surface 105 is positioned on a flat surface) to facilitate applying the load(s) to the foot 109. For example, one or more weights can be placed on the foot 109 after the base 102 is flipped over.

At block 774, the method 770 includes generating a calibration curve (e.g., a multi-point calibration curve) for the load cell 340 based at least in part on the measured load and the known load applied. At block 776, the method 770 includes determining whether all load cells 340 have been tested. If no, the method 770 returns to block 772 until a calibration curve is generated for each of the load cells 340 for each of the feet 109. If yes, the method proceeds to block 778 and the processor 560 is configured to apply the calibration curves for the load cells 340. In this manner, each of the load cells 340 can be calibrated individually with a multi-point calibration curve, and each calibration curve is applied specifically and individually to a corresponding one of the load cells 340 by the processor 560.

In some implementations, a known load can be applied to each of the feet 109 simultaneously. For example, a calibration rig can be automated and configured to apply a load to each of the load cells 340 individually but simultaneously. The calibration rig can then compare the applied loads to the resulting measurements generated by the load cells 340 to generate the calibration curves for the load cells 340. Thus, in some implementations, a calibration rig of other suitable machine can be configured to provide a multi-point calibration of each of the load cells 340 simultaneously but individually.

Most if not all conventional scales have load cells wired together into a Wheatstone bridge, which is then fed into an ADC. As a result, most scales can be calibrated simply by placing weights on top of the scale. However, because the load cells 340 of the present technology are coupled to the separate ADCs 562 (shown in FIG. 5) to better compensate for temperature transients, known weights (e.g., dead weights, a higher accuracy load cell, etc.) must be applied to each load cell 340 individually to calibrate the load cells 340. That is, to get a useful calibration, the load cells 340 are calibrated individually rather than all together.

In some implementations, temperature calibration curves for the load cells 340 can be generated using an average temperature calibration curve that can be applied to all load cells 340 across multiple products (e.g., multiple ones of the bases 102). Alternatively, temperature calibration curves for the load cells 340 can be generated along with at the same time the weight calibration curves (described in detail with reference to FIG. 7) during assembly (e.g., in a factory). For example, the weight measurements generated by the individual load cells 340 (e.g., block 772) can be compared to known/detected temperatures of the load cells 340 to generate temperature calibration curves for the load cells 340. In other implementations, the temperature calibration curves can be generated at a user location by running a scale calibration routine (e.g., a routine running on the processor 560 of FIG. 5) on individual load cells 340 or by generating an average curve for all the load cells 340. For example, the processor 560 can be configured to communicate with one or more remote server computing devices for receiving/calculating temperature coefficients for the load cells 340.

In some implementations, temperature calibration curves for the load cells 340 can be generated at the same time as the weight calibration curves described in detail with reference to FIG. 7. For example, the weight measurements generated by the individual load cells 340 (e.g., block 772) can be compared to known/detected temperatures of the load cells 340 to generate temperature calibration curves for the load cells 340. In other implementations, the temperature calibration curves can be generated at a user location by running a scale calibration routine (e.g., a routine running on the processor 560 of FIG. 5). For example, the processor 560 can be configured to communicate with one or more remote server computing devices for receiving/calculating temperature coefficients for the load cells 340.

Figure 8:
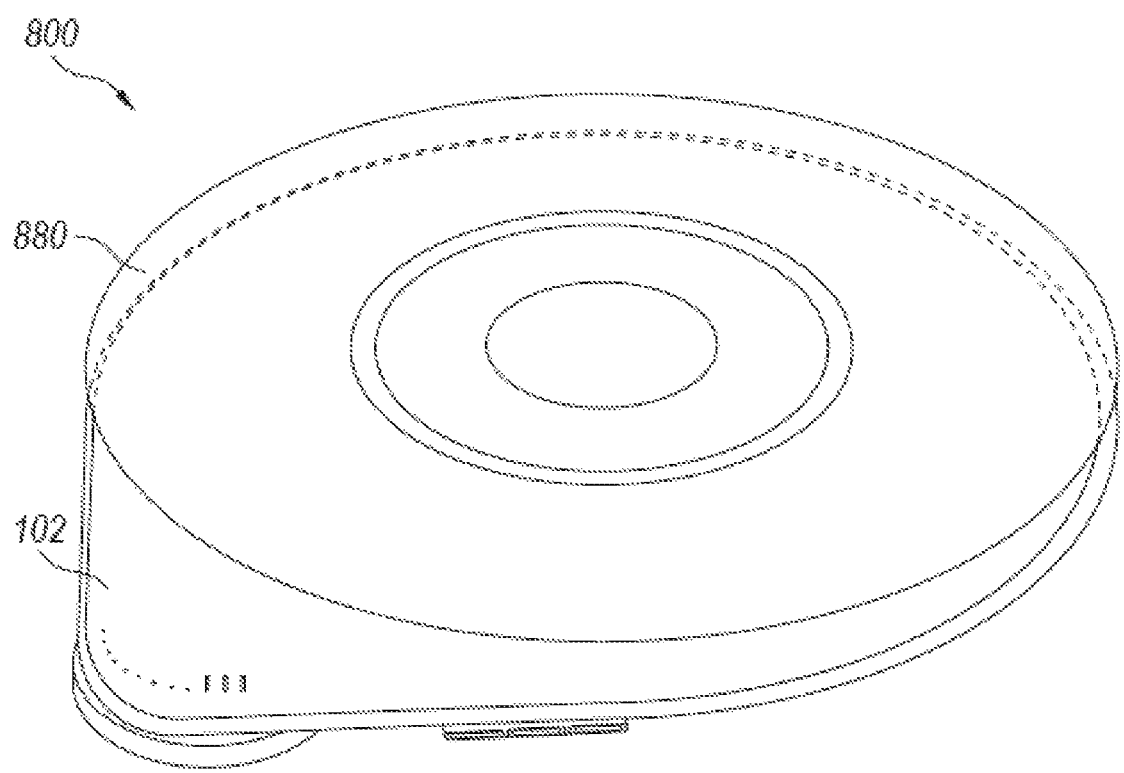
FIG. 8 is a perspective view of an alternative example cooking system.

FIG. 8 is a perspective view of a cooking system 800 configured in accordance with another embodiment of the present technology. As illustrated, a plate 880 is positioned on the base 102 instead of the cooking appliance 104 (FIGS. 1 and 2). The plate 880 can be interchanged/swapped with the cooking appliance 104, but the plate 880 can facilitate the measurement of items (and not necessarily food items) placed on the plate without requiring that the items be placed in the cooking appliance 104.

The above Detailed Description of examples of the present technology is not intended to be exhaustive or to limit the present technology to the precise form disclosed above. While specific examples for the present technology are described above for illustrative purposes, various equivalent modifications are possible within the scope of the present technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the present technology in light of the above Detailed Description. While the Detailed Description describes certain examples of the present technology as well as the best mode contemplated, the present technology can be practiced in many ways, no matter how detailed the above description appears in text. Details of the system may vary considerably in its specific implementation, while still being encompassed by the technology disclosed herein. As noted above, particular terminology used when describing certain features or aspects of the present technology should not be taken to imply that the terminology is being redefined herein to be restricted to any specific characteristics, features, or aspects of the present technology with which that terminology is associated. Accordingly, the present technology is not limited, except as by the appended claims. In general, the terms used in the following claims should not be construed to limit the present technology to the specific examples disclosed in the specification, unless the above Detailed Description section explicitly defines such terms.

Although certain aspects of the present technology are presented below in certain claim forms, the applicant contemplates the various aspects of the present technology in any number of claim forms. Accordingly, the applicant reserves the right to pursue additional claims after filing this application to pursue such additional claim forms, in either this application or in a continuing application.

The invention claimed is:

1. A scale comprising:
   multiple load cells, wherein each load cell is configured to detect a weight of an item positioned on the scale and to output a signal indicating the detected weight of the item;
   multiple temperature sensors, wherein each temperature sensor is configured to detect a temperature proximate to a corresponding one of the load cells to thereby determine the temperature of the corresponding load cells; and
   a processor communicatively coupled to the load cells and the temperature sensors, wherein the processor is configured to determine a temperature compensated weight of the item positioned on the scale based at least in part on the detected weights and the detected temperatures,
   wherein the processor is configured to receive and process the detected weight and corresponding temperature of each load cell separately to determine the temperature compensated load cell calibration of each load cell separately and the temperature compensated weight of the item;
   wherein the processor compensates for changing temperatures of the load cells by applying one or more predetermined models for temperature-dependency of the load cells; and
   wherein the processor estimates the weight of the item by applying a non-linear model for the temperature dependency of the load cells to the signals output from the load cells.

2. The scale of claim 1, further comprising a heat sink, wherein the load cells are mounted to the heat sink, and wherein the temperature sensors are mounted to the heat sink.

3. The scale of claim 1, further comprising multiple analog-to-digital converters (ADCs), wherein each ADC is (a) electrically coupled to the processor and to a corresponding one of the load cells and (b) configured to transmit a digital signal to the processor representative of the weight detected by the corresponding one of the load cells.

4. The scale of claim 1, wherein the processor is configured to receive, from individual ones of the load cells, a signal representative of the weight detected by the respective load cell.

5. The scale of claim 1, wherein the multiple load cells include four load cells positioned generally symmetrically about a longitudinal axis.

6. The scale of claim 1, further comprising:
   an enclosure, wherein the load cells and the temperature sensors are mounted within the enclosure, and wherein the enclosure includes an opening extending through a lower portion thereof; and
   a flexible barrier coupled to the enclosure over the opening, wherein the load cells are operably coupled to the flexible barrier, and wherein the flexible barrier is configured to inhibit fluid from entering the enclosure through the opening.

7. The scale of claim 1, wherein each of the temperature sensors are secured to the corresponding ones of the load cells.

8. A cooking system comprising;
   a cooking appliance; and
   a base, wherein the cooking appliance is configured to be removably positioned on the base and to receive and cook a food product, and wherein the base includes:
   multiple load cells, wherein individual ones of the load cells are configured to detect a weight of the food product and to output a signal indicating the detected weight of the food product;
   multiple temperature sensors, wherein individual ones of the temperature sensors are (a) positioned proximate to a corresponding one of the load cells and (b) configured to detect a temperature proximate to the corresponding one of the load cells; and
   a processor communicatively coupled to the load cells and the temperature sensors, wherein the processor is configured to:
   receive the detected weights and the detected temperatures; and
   determine a temperature compensated weight of the food product based at least in part on the detected weights and the detected temperatures;
   compensate for changing temperatures of the load cells by applying one or more predetermined models for temperature-dependency of the load cells; and
   estimate the weight of the food product by applying a non-linear model for the temperature dependency of the load cells to the signals output from the load cells;
   wherein the processor is configured to receive and process the detected weight and corresponding temperature of each load cell separately to determine the temperature compensated load cell calibration of each load cell separately and the temperature compensated weight of the item.

9. The cooking system of claim 8, wherein the cooking appliance is a pressure cooker.

10. The cooking system of claim 8, wherein the processor is configured to determine the temperature compensated weight of the food product as the temperature of the food product changes during cooking.

11. The cooking system of claim 8, wherein the cooking appliance is configured to be communicatively coupled to the base when the cooking appliance is positioned on the base, and wherein the base includes a user input device configured to receive a user input for changing a cooking parameter of the cooking appliance.

12. The cooking system of claim 8, wherein the base further includes:
   an enclosure, wherein the load cells and the temperature sensors are mounted within the enclosure, and wherein the enclosure includes an opening extending through a lower portion thereof; and
   a silicone membrane coupled to the enclosure over the opening, wherein the load cells are operably coupled to the silicone membrane.

* * * * *